United States Patent [19]

Stengel-Rutkowski et al.

[11] Patent Number: 5,925,694
[45] Date of Patent: Jul. 20, 1999

[54] EPOXY AND EPOXY-POLYACRYLATE DISPERSIONS CONTAINING REACTIVE DILUENT PROCESSES FOR THEIR PRODUCTION AND THEIR USE

[75] Inventors: Bernhard Stengel-Rutkowski, Wiesbaden; Claus Godau, Kiedrich; Armin Pfeil, Kaufering, all of Germany

[73] Assignee: Vianova Resins GmbH, Mainz-Kastel, Germany

[21] Appl. No.: 08/710,985

[22] Filed: Sep. 25, 1996

[30] Foreign Application Priority Data

Sep. 29, 1995 [DE] Germany .................. 195 36 381

[51] Int. Cl.$^6$ ................ C08K 3/20; C08L 63/02
[52] U.S. Cl. ............ 523/412; 428/441; 523/404; 523/418; 523/423
[58] Field of Search ................ 523/404, 412, 523/418, 423; 428/441

[56] References Cited

U.S. PATENT DOCUMENTS

| | | | |
|---|---|---|---|
| 3,870,666 | 3/1975 | Becker ........................ | 260/21 |
| 4,197,389 | 4/1980 | Becker et al. ................ | 528/103 |
| 4,315,044 | 2/1982 | Elmore et al. ................ | 427/386 |
| 4,399,242 | 8/1983 | Fowler et al. ............... | 523/404 |
| 4,423,201 | 12/1983 | Hicks .......................... | 528/76 |
| 4,446,256 | 5/1984 | Hicks .......................... | 523/402 |
| 4,608,406 | 8/1986 | Williams, Jr. et al. ....... | 523/424 |
| 4,886,845 | 12/1989 | Becker et al. ................ | 523/403 |
| 5,236,974 | 8/1993 | Dreischhoff et al. ......... | 523/403 |
| 5,274,012 | 12/1993 | Neffgen et al. .............. | 523/415 |
| 5,523,336 | 6/1996 | Schreiber .................... | 523/406 |
| 5,612,394 | 3/1997 | Pfeil et al. ................... | 523/403 |

FOREIGN PATENT DOCUMENTS

| | | |
|---|---|---|
| 0 109 173 | 5/1984 | European Pat. Off. . |
| 0109173 | 5/1984 | European Pat. Off. . |
| 0 497 404 | 1/1992 | European Pat. Off. . |
| 639593 | 2/1995 | European Pat. Off. . |
| 91/10695 | 7/1991 | WIPO . |

OTHER PUBLICATIONS

Lee & Neville, Handbook of Epoxy Resins, 1967, pp. 13–9 & 13–15, Mar. 1967.

*Primary Examiner*—Robert Dawson
*Assistant Examiner*—D. Aylward
*Attorney, Agent, or Firm*—Foley & Lardner

[57] ABSTRACT

Aqueous, low-solvent coating compositions comprising a base resin dispersion comprising of an epoxy resin, prepared by condensation of one or more epoxide compounds having at least two epoxide groups per molecule and an aromatic polyol; a dispersant comprising a condensation product of an aliphatic polyol having a weight-average molar mass ($M_w$) of from 200 to 20,000 g/mol and an epoxide compound having at least two epoxide groups per molecule, and low molar mass, liquid, epoxy-functional compounds as diluents, and also water; an aqueous curing agent for the modified epoxy resin (I), which is suitable for curing at room temperature or at elevated temperatures (forced drying), components (I) and (II) being employed in mass fractions such that the ratio of the number of reactive epoxide groups in (I) to the number of amine hydrogen atoms in (II) is between 1:0.75 and 1:2. The coating compositions exhibit an extended pot life. They can be used to produce coatings and in water-soluble adhesives.

23 Claims, No Drawings

EPOXY AND EPOXY-POLYACRYLATE DISPERSIONS CONTAINING REACTIVE DILUENT PROCESSES FOR THEIR PRODUCTION AND THEIR USE

BACKGROUND OF THE INVENTION

DE-A 36 43 751 discloses aqueous epoxy resin dispersions which are prepared in the presence of a condensation product of an aliphatic polyol and an epoxide compound as emulsifier. However, these aqueous dispersions include not only water but always a certain quantity of organic solvents. DE-A 41 28 487 describes a method of reducing further this quantity of organic solvents while at the same time improving the properties of these dispersions. For this purpose, the base resin is no longer condensed in the presence of the emulsifier, and flexibilizing polyepoxides are used as raw materials for the epoxy resin. Polypropylene glycol diglycidyl ether is employed in the examples of DE-A 41 28 487.

These dispersions have a markedly reduced organic solvent content with improved performance properties. In connection with endeavors to minimize further and further all the time the amount of volatile organic components in aqueous coating compositions, however, even the reduced solvent content proves to be problematic. Moreover, in order to flexibilize the base resin it is necessary to employ expensive raw materials, which may in addition have adverse effects on the profile of properties.

Cold-curing systems in particular, such as, for example, those used for corrosion prevention and buildings protection, or those subjected to forced drying, receive a particularly critical inspection from the standpoint of solvent emission, since in this case it is not possible, as with stoving systems, to carry out thermal incineration of the solvent afterwards.

A substantial improvement of the existing systems, therefore, would be a binder based on a completely organic solvent-free dispersion, which can be employed for the sector of cold-curing coatings.

The solvents employed serve primarily, in general, as coalescence agents, which slowly evaporate from the film after it is formed and therefore give rise to unfavorable working conditions from the standpoint of industrial hygiene and to unwanted emission of organic constituents into the atmosphere. In addition, the coating unavoidably retains solvent residues, which adversely affect its properties. Without such solvents, however, film formation and leveling are poor, leading to cloudy, poorly adhering films.

The fact that reactive diluents can have a positive effect (reducing viscosity) in conventional epoxy resin formulations and water-dilutable liquid resins is familiar to the person skilled in the art. However, their use in epoxy solid-resin dispersions has been rarely described. U.S. Pat. Nos. 4,315,044, U.S. Pat. No. 4,399,242 and U.S. Pat. No. 4,608,406 describe the use of $C_8$–$C_{80}$-alkyl monoepoxides in nonionically stabilized epoxy solid-resin dispersions for curing at room temperature or with heating. In the above-mentioned patents, these reactive diluents are stirred into the finished dispersion for improving the shear stability, the freeze-thaw stability, the storage stability and the gloss of the coatings, although some of these effects can only be achieved satisfactorily by the additional use of glycols and/or glycol ethers.

Not mentioned, in contrast, is the function of the reactive diluents as coalescence agents. In particular, there is no mention of the fact that addition to the resin prior to the actual dispersion process is particularly advantageous.

The subsequent admixture of substances to a finished, nonionically stabilized solid-resin dispersion, especially when it has a high solids content, is a very awkward operation, since it requires the thorough homogenization with one another of components of different viscosities and polarities, something which does not take place satisfactorily in relatively large mixing units. Moreover, it is not possible in this way to achieve so high a degree of mixing of resin and reactive diluent, since these components are present in separate micelles.

SUMMARY OF THE INVENTION

One object of the present invention is to produce improved epoxy and epoxy-acrylate dispersions which contain reactive diluent, no longer require further coalescence agents and at the same time have markedly improved properties relative to conventional dispersions and to those with reactive diluents added subsequently.

Another object of the invention is to provide a process for preparing the improved resin dispersions according to the invention.

A still further object of the invention resides in providing improved adhesives and matt coating compositions.

It has surprisingly now been found that, by the use of reactive diluents in accordance with a special procedure, namely prior to the dispersion process, it is possible to produce different epoxy resin or epoxy-polyacrylate dispersions which are always of extremely low solvent content or are even solvent-free, and which are highly suited to room temperature curing or forced drying and, even without the addition of further coalescence agents, exhibit outstanding film formation and very good performance properties.

The invention accordingly provides aqueous, low-solvent or solvent-free coating compositions comprising the following components:

(I) a base resin dispersion comprising
  (A) an epoxy resin which is a condensation product of mass fractions of
    (A-1) from 50 to 95%, preferably from 55 to 85%, of one or more epoxide compounds having at least two epoxide groups per molecule and preferably an epoxide group content of from 300 to 12,000 mmol/kg ("epoxide equivalent weight"=molar mass divided by number of epoxide groups per molecule of from 90 to 3000 g/mol),
    (A-2) from 5 to 50%, preferably from 15 to 45%, of an aromatic polyol, and optionally
    (A-3) from 0 to 25%, preferably from 1 to 10%, of modifying compounds having at least two epoxide-reactive groups,
  (B) a dispersant comprising
    (B-1) a condensation product of
      (B-11) an aliphatic polyol having a weight-average molar mass ($M_w$) of from 200 to 20,000 g/mol and
      (B-12) an epoxide compound having at least two epoxide groups per molecule and preferably an epoxide group content of from 500 to 10,000 mmol/kg (epoxide equivalent weight of from 100 to 2000 g/mol),
the ratio of the number of hydroxyl groups to the number of epoxide groups preferably being from 1:0.5 to 1:3.5 and the epoxide group content of this condensation product being between 2.5 and 200 mmol/kg (epoxide equivalent weight of between 5000 and 400,000 g/mol), and
    (B-2) optionally, further, preferably non-ionic surfactants, (C) a diluent comprising (C-1) low molar mass, liquid, epoxy-functional compounds, and (c-2) optionally, ethylenically unsaturated monomers which are otherwise inert or, if desired, functional and are capable of free-radical polymerization or copolymerization, (D) and water and, optionally, an organic solvent, (II) an aqueous curing agent for the modified epoxy resin (I), which is suitable for curing at room temperature or at elevated temperatures (forced drying), and, optionally, (III) customary additives and catalysts, components (I) and (II) being employed in mass fractions such that the ratio of the number of epoxide groups in (I) which are capable of reaction to the number of amine hydrogen atoms in (II) is between 1:0.75 and 1:2, and the sum of the mass fractions is 100%.

The invention additionally provides a process for producing an aqueous epoxy resin dispersion (I), which comprises first of all preparing the epoxy resin (A) by condensation of components (A-1), (A-2) and, if used, (A-3) at elevated temperatures in the presence of a condensation catalyst, then at a lower temperature adding diluent (C-1), subsequently incorporating dispersant (B) by homogenization and obtaining an aqueous dispersion by the portionwise addition of water (D).

The invention furthermore provides a process for producing an aqueous epoxy-polyacrylate dispersion (I), which comprises first preparing epoxy resin (A) by condensation of components (A-1), (A-2) and, if used, (A-3) at elevated temperatures in the presence of a condensation catalyst, then at a lower temperature adding at least a portion of the diluent (C) and, if desired, carrying out a partial reaction of the monomers (C-2) with the epoxy resin (A), then incorporating the dispersant (B) by homogenization and obtaining an aqueous dispersion by the portionwise addition of water (D), the monomers (C-2) subsequently being converted completely into a polymer dispersion with the aid of an appropriate initiator system and, if appropriate, with the addition of the remaining diluent (C), at suitable temperatures. The diluent portions which may be used if desired can differ in their composition in terms of the quantity and nature of the constituents (C-1) and (C-2).

The novel binder is prepared by blending this dispersion with a suitable curing agent (II), followed, if desired, by additives according to (III) which are known to the person skilled in the art.

Further objects, features and advantages of the invention will become apparent to those skilled in the art from the detailed description of preferred embodiments that follows.

DETAILED DESCRIPTION OF PREFERRED EMBODIMENTS

The 1,2-epoxide compounds according to (A-1) and (B-12) are polyepoxides having on average at least two epoxide groups per molecule. These epoxide compounds may be either saturated or unsaturated and may be aliphatic, cycloaliphatic, aromatic and/or heterocyclic, and may also contain hydroxyl groups and polyether units. Furthermore, they may contain those substituents and/or functional groups which, under the conditions of mixing or reaction, do not cause any interfering secondary reactions, examples being alkyl or aryl substituents, ether groups and the like.

The epoxide compounds are preferably polyglycidyl ethers based on polyhydric, preferably dihydric, alcohols, phenols, hydrogenation products of these phenols, and/or on novolaks (reaction products of mono- or polyhydric phenols with aldehydes, especially formaldehyde, in the presence of acidic catalysts). The epoxide group contents of these epoxy compounds are preferably between 500 and 11,000 mmol/kg, in particular between 2800 and 10,000 mmol/kg (epoxide equivalent weights of between 90 and 2000 g/mol, in particular between 100 and 350 g/mol).

Examples of polyhydric phenols are resorcinol, hydroquinone, 2,2-bis(4-hydroxyphenyl)propane (bisphenol A), dihydroxydiphenylmethane (bisphenol F, isomer mixtures if desired), tetrabromobisphenol A, 4,4'-dihydroxydiphenylcyclohexane 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 2,2-bis[4-(2-hydroxypropoxy)phenyl]propane, 1,1-bis(4-hydroxyphenyl)isobutane, 2,2-bis(4-hydroxy-3-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulfone, etc., and also the halogenation and hydrogenation products of the abovementioned compounds. Bisphenol A is particularly preferred in this context.

Examples of polyhydric alcohols are ethylene glycol, diethylene glycol, triethylene glycol, polyethylene glycols (n=1 to 35), 1,2-propylene glycol, polypropylene glycols (n=1 to 15), 1,3-propylene glycol, 1,4-butanediol, 1,5-pentanediol, 1,6-hexanediol, 1,2,6-hexanetriol, glycerol, neopentane glycol, 1,4-dimethylolcyclohexane, trimethylolethane, trimethylolpropane, and also block copolymers of ethylene oxide, propylene oxide, etc., and, in addition, ethoxylated and propoxylated bisphenols such as propoxylated bisphenol A, for example. Polyethylene glycols and polypropylene glycols (n=8–10) are particularly preferred in this context.

Polyglycidyl esters of polycarboxylic acids can also be used, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid, or else with acidic polyesters. Examples are diglycidyl adipate, diglycidyl phthalate and diglycidyl hexahydrophthalate.

A detailed listing of suitable epoxide compounds can be found in the handbook "Epoxidverbindungen und Epoxidharze" [Epoxide compounds and epoxy resins] by A. M. Paquin, Springer Verlag, Berlin 1958, chapter IV and in Lee, Neville, "Handbook of Epoxy Resins", McGraw-Hill Book Co., 1967, chapter 2. These epoxide compounds can be employed individually or in a mixture.

Suitable aromatic polyols according to (A-2) are preferably the aromatic compounds containing OH groups which were described above for components (A-1) and (B-12), i.e. polyhydric, preferably dihydric phenols, their halogenation products and/or novolaks. In this context too, bisphenol A is particularly preferred.

The modifying compounds according to (A-3) are compounds having at least two functional groups which are able to react with the epoxide groups of component (A-1), which compounds cannot be classified under the aromatic polyols according to (A-2). They can be used for targeted modification to establish desirable properties in the base resin (A). The compounds used in this context may be polyamines (e.g., ethylenediamine, diethylenetriamine, triethylenetetramine, tetraethylenepentamine, etc.), polyoxyalkylene oxides with terminal amino groups (e.g., the Jeffamine® from TEXACO and Novamin® grades), aliphatic and aromatic polycarboxylic acids having 2 to 60 carbon atoms (e.g., maleic acid, fumaric acid, phthalic acid, succinic acid, dimeric and trimeric fatty acids, etc., and their anhydrides where available) and also aliphatic polyols (e.g., ethylene glycol, propylene glycol, butylene glycol, polyethylene glycol, polypropylene glycol, trimethylolpropane and -ethane, neopentylglycol, glycerol, etc.). Particular preference is given to dimeric fatty acids having a content of 20 to 50 carbon atoms and to Jeffamine®.

The polyols (B-11) of component (B-1) are preferably polyether polyols (polyoxyalkylene glycols) having weight-average molar masses ($M_w$; gel permeation chromatography; polystyrene standard) of preferably between 600 and 12,000 g/mol, in particular from 2000 to 8000 g/mol, and OH numbers which are advantageously from 10 to 600 mg/g, preferably from 15 to 120 mg/g. These polyether polyols preferably possess only terminal, primary OH groups. Examples of these are block copolymers of ethylene oxide and propylene oxide and also polyethylene glycols, polypropylene glycols and polybutylene glycols, with the use of mixtures of the respective polyalkylene glycols also being possible. Polyethylene glycols are preferably used.

In addition to the novel dispersant (B-1) it is also possible to use other dispersants (B-2) of anionic, cationic and, preferably, nonionic type. Suitable anionic surfactants are alkylbenzenesulfonates, primary and secondary alkanesulfonates, α-olefinsulfonates, alkyl sulfates and alkyl ether sulfates, while suitable cationic surfactants are quaternary ammonium compounds, where the ionic groups must not interact with the epoxide groups. However, preference is given to the use of nonionic surfactants, such as ethoxylated or eth/propoxylated alcohols, oxo alcohols, alkylphenols (e.g. Arcopal® from Hoechst), castor oils, esters, glycerol stearates, fatty acids, fatty amines, fatty alcohols, and also, for example, ethylene oxide-propylene oxide block copolymers (e.g. Pluronic® from BASF). It is also possible to employ the emulsifiers described specifically for the dispersion of epoxy resins, for example, from U.S. Pat. No. 4 423 201 and U.S. Pat. No. 4 446 256 (products of polyalkylene glycols, diisocyanates and bisphenols), EP 0 497 404 (products of alkoxypolyalkylene glycols, anhydrides and alkylene oxides, epoxy alcohols or diglycidyl ethers), WO 91/10695 (products of polyglycidyl ethers, bifunctional compounds and alkoxypolyalkylene glycols), EP 0 109 173 (products of polyoxyalkylenepolyamines and epoxy resins) and DE 41 36 943 (products of polyalkylene glycols with diisocyanates and polyepoxides).

Low molar mass, liquid, epoxy-functional compounds as component (C-1) which can be mentioned are low molar mass ethers of glycidyl alcohol with mono- and polyhydric phenols, alkyl-substituted phenols and mono- and polyhydric aliphatic branched and unbranched alcohols and esters of branched or unbranched aliphatic carboxylic acids having 2 to 40 carbon atoms, which are known inter alia by the term reactive diluents, examples being para-tert-butylphenyl glycidyl ether, n-butyl glycidyl ether, phenyl glycidyl ether, ortho-cresyl glycidyl ether, butanediol diglycidyl ether, hexanediol diglycidyl ether, neopentylglycol diglycidyl ether, dimethylolcyclohexane diglycidyl ether, 2-ethylhexyl glycidyl ether, higher alkyl glycidyl ethers, etc. (e.g., the reactive diluents from the series Grilonit® RV from Ems, Epodil® from Anchor or Eurepox® RV from Schering), Versatic acid glycidyl esters (Cardura® 10 from Shell), liquid polyoxyalkylene glycol diglycidyl ethers (e.g., Beckopox® EP 075 from Hoechst), and also liquid epoxy resins such as bisphenol A diglycidyl ether and bisphenol F diglycidyl ether, for example. Component (C-1) is referred to below for simplicity as reactive diluent. Preferred reactive diluents are hexanediol diglycidyl ether and para-tert-butylphenyl glycidyl ether.

Suitable monomers according to (C-2) are all ethylenically unsaturated compounds which are capable of free-radical polymerization in aqueous emulsion and which do not interact undesirably at room temperature with the epoxy resin dispersion present. These include acrylic, methacrylic and higher alkacrylic acids and their alkyl esters ($C_1$- to $C_{18}$-alkyl (meth)acrylates, for example methyl acrylate and methacrylate, ethyl acrylate and methacrylate, n- and iso-propyl acrylate and methacrylate, n-, iso- and tert-butyl acrylate, n- and tert-butyl methacrylate, 2-ethylhexyl acrylate and methacrylate, 4-tert-butylcyclohexyl acrylate, isobornyl acrylate and methacrylate, etc.) and derivatives (e.g., acrylonitrile) and also vinyl derivatives (e.g., styrene, α-methylstyrene, vinyltoluenes, vinyl acetate, vinyl chloride, vinylidene chloride, N-vinylpyrrolidone, etc.) and α,β-unsaturated carboxylic acids such as maleic acid, fumaric acid, itaconic acid, etc., and derivatives thereof, and also alkenes such as isoprene and butadiene. The monomers can also include functional groups which participate in the curing reaction which is desired at a later time, and specific examples of compounds which are suitable in this context are glycidyl-functional monomers (e.g. glycidyl methacrylate, glycidyl acrylate). Finally, it is also possible for monomers which are polyfunctional, whether with respect to the polymerization or to the curing, to be present, for instance, 1,6-hexanediol diacrylate, divinylbenzene, etc.

If desired, solvents (D) can also be added to the dispersion, preferably in mass fractions of up to 10%. Particularly suitable organic solvents in this context are glycols, mono- and diethers and mono- and diesters of glycols with alcohols and acids, aliphatic alcohols having linear or branched alkyl radicals of 1 to 12 carbon atoms, cycloaliphatic and araliphatic alcohols and also esters and ketones, which solvents can be employed individually or in a mixture. Examples are ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and also methyl isobutyl ketone, although aromatic compounds such as toluene or xylene can also be used. Preferred solvents are butylglycol, methoxypropanol, methoxybutanol, iso-propoxypropanol, ethoxypropanol, 2-propanol and/or benzyl alcohol.

After the operation of dispersion has been completed, the emulsion polymerization is initiated in the epoxy resin dispersion at a temperature which ensures rapid and complete reaction and at the same time does not pose a threat to the dispersion. Suitable initiators for this purpose are those of the thermal type, or redox systems, all of which are well known to those skilled in the art. Thermal initiators are peroxides, hydroperoxides, peresters, diazo compounds, for example, dibenzoyl peroxide, acetyl peroxide, benzoyl hydroperoxide, tert-butyl hydroperoxide, di-tert-butyl peroxide, lauroyl peroxide, butyryl peroxide, diisopropylbenzene hydroperoxide, cumene hydroperoxide, paramenthane hydroperoxide, diacetyl peroxide, di-β-cumyl peroxide, dipropyl peroxide, diisopropyl peroxide, isopropyl tert-butyl peroxide, butyl tert-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol peroxide, diethyl peroxyterephthalate, propyl hydroperoxide, isopropyl hydroperoxide, n-butyl hydroperoxide, cyclohexyl hydroperoxide, trans-decalin hydroperoxide, α-methylbenzyl hydroperoxide, α-methyl-α-ethylbenzyl hydroperoxide, tetralin hydroperoxide, triphenylmethyl hydroperoxide, diphenylmethyl hydroperoxide, 2,5-dimethyl-2,5-bis(2-ethylhexanoyl-peroxy)hexane, 1,1-bis(tert-butylperoxy)cyclohexane and tert-butyl perbenzoate. Redox systems can be chosen from oxidizing agents, for example, hydrogen peroxide, tert-butyl hydroperoxide, persulfates, in combination with reducing agents such as alpha-hydroxy ketones, ascorbic acid, hydrazine and sulfites, bisulfites, metasulfites or hydrosulfites. Preferably, initiators should be employed which generate few or no ionic compounds, in order not to unnecessarily raise the water sensitivity of the subsequently stoved films. A particularly preferred system is tert-butyl hydroperoxide/ascorbic acid.

As hardeners (II) for the epoxy resins (I) of the invention it is possible to employ the curing agents or curing compounds (epoxide hardeners) which are known for this purpose, such as basic curing agents (amine hardeners), for example, polyamines, Mannich bases, adducts of amines with polymers, such as polyepoxides and polyamidoamines.

The novel epoxy resin dispersions (I) can also be cured by means of so-called latent curing agents, i.e., compounds which develop a crosslinking action with respect to epoxide compounds only at a relatively high temperature, for example, at from 60 to 250° C. Examples of such hardeners are urea, dicyandiamide, imidazole and imidazoline, and also substituted (for example with alkyl or alkoxy groups) imidazoles and imidazolines, benzoguanamine and acetoguanamine, guanidine, hydrazide and derivatives of these compounds. However, melamine resins or acidic curing agents, for example, are also conceivable. Among these latent curing agents, preference is given to the use of dicyandiamide.

Examples of basic curing agents, preferably for the preferred curing at room temperature and/or relatively low temperatures (amine cold hardeners), which are generally employed in a ratio of the number of epoxide groups to the number of amine hydrogen atoms of 1:0.75 to 1:2), are polyalkyleneamines, such as diethylenetriamine, triethylenetetramine, tetraethylenepentamine, pentaethylenehexamine and so on, and also 2,2,4- and/or 2,4,4-trimethylhexamethylenediamine, bis(3-aminopropyl)amine, 1,4-bis(3-aminopropyl)piperazine, N,N-bis(3-aminopropyl)ethylenediamine, neopentanediamine, 2-methyl-1,5-pentanediamine, 1,3-diaminopentane, hexamethylenediamine, etc., and cycloaliphatic amines such as 1,2- and 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexyl-methane and -propane, 2,2-bis(4-aminocyclohexyl)-methane and -propane, 3,3'-dimethyl-4,4'-diaminodicyclohexyl-methane, 3-amino-1-cyclohexylaminopropane, 1,3- and 1,4-bis(aminomethyl)cyclohexane.

As araliphatic amines, use is made in particular of those including aliphatic amino groups, examples being meta- and para-xylylenediamine, and/or of hydrogenation products thereof. The abovementioned amines can be used alone or as mixtures.

Suitable Mannich bases are prepared by condensation of polyamines, preferably diethylenetriamine, triethylenetetramine, isophoronediamine, 2,2,4- and 2,4,4-trimethylhexamethylenediamine, 1,3- and 1,4-bis-(aminomethyl)cyclohexane, especially meta- and para-xylylenediamine, with aldehydes, preferably formaldehyde, and mono- or polyhydric phenols having at least one ring position which is reactive toward aldehydes, examples being the various cresols and xylenols, para-tert-butylphenol, resorcinol, 4,4'-dihydroxydiphenylmethane, 4,4'-dihydroxydiphenyl-2,2-propane, but preferably phenol.

Suitable amine-epoxy adducts are, for example, reaction products of polyamines such as ethylenediamine, propylenediamine, hexamethylenediamine, 2,2,4- and 2,4,4-trimethylhexamethylenediamine, meta-xylylenediamine and/or bis(aminomethyl)cyclohexane, with terminal mono- or polyepoxides, for example, propylene oxide, hexene oxide, cyclohexene oxide, or with glycidyl ethers, such as phenyl glycidyl ether, tert-butyl glycidyl ether, ethylhexyl glycidyl ether or butyl glycidyl ether, or with glycidyl esters, such as the glycidyl ester of Versatic acid marketed by Shell, Cardura® E 10, or the polyglycidyl ethers and esters mentioned under (A-1).

Polyamidoamines which can be used to cure the novel epoxy resin dispersions are obtained, for example, by reacting polyamines with mono- or polycarboxylic acids, for example dimerized fatty acids.

Preferred amine hardeners employed, in addition to the abovementioned polyamines, are water-soluble polyoxyalkylene di- and poly-amines with molar masses of from 100 to 2000 g/mol, for example the products marketed by Texaco under the tradename Jeffamine®, and the readily water-dispersible curing agents as described in DE-A 23 32 177 and EP-A 0 000 605, i.e., modified amine adducts, for example.

In order to achieve more rapid and/or more complete through-curing it is also possible to heat the coatings which are obtainable from the novel epoxy resin dispersions with the abovementioned amine hardeners at from 50 to 120° C. for from 15 to 120 minutes (so-called forced drying).

Customary additives in the context of (III) which can be used, if appropriate, in the novel dispersions and binders are, for example, the customary paint additives, such as pigments, pigment pastes, antioxidants, leveling agents and thickeners, antifoam/deaerating agents and/or wetting agents, reactive diluents, fillers, catalysts, preservatives, protective colloids and the like. These additives, like the hardeners, can, if desired, be added to the dispersion not until directly prior to processing.

In order to prepare the novel dispersions the epoxy resin (A) is first of all prepared by condensation of components (A-1) and (A-2), if appropriate with (A-3), at elevated temperatures, in general at from 100 to 220° C., preferably at from 150 to 180° C., in the presence of a catalyst which accelerates the condensation reaction.

Examples of suitable condensation catalysts are phosphines, such as triphenylphosphine, phosphonium salts, for example benzyltrimethylphosphonium chloride, tertiary amines, such as N,N-dimethylbenzylamine, quaternary ammonium salts, such as tetramethylammonium chloride, alkali metal hydroxides, such as sodium hydroxide and lithium hydroxide, alkali metal carbonates, such as sodium carbonate and lithium carbonate, alkali metal salts of organic acids, for example sodium formate, lithium benzoate and lithium stearate, and Lewis acids, for example boron trifluoride and its complexes, titanium tetrachloride, tin chloride and triethyloxonium tetra-fluoroborate.

If two or more epoxide compounds (A-1) are employed, then the condensation reaction is preferably carried out in two stages, involving a first reaction where one or more components (A-1) are reacted with the components according to (A-2) and, if used, (A-3) in a quantitative proportion which is such that this first condensation product has an epoxide group content of below 200 mmol/kg, preferably below 50 mmol/kg (epoxide equivalent weight greater than 5000 g/mol, preferably greater than 20,000 g/mol) and still contains free phenolic groups, and where, in a further condensation reaction, this first condensation product is reacted with further epoxide compounds according to (A-1) to give, finally, the desired epoxy resin (A).

The dispersant (B-1) is prepared by condensation of the abovementioned polyether polyols with the polyglycidyl ethers according to (A-1) in the presence of appropriate catalysts at from 50 to 200° C., preferably at from 90 to 170° C., the ratio of the number of hydroxyl groups to the number of epoxide groups being from 1:0.5 to 1:8, preferably from 1:0.85 to 1:4, and the epoxide group content of the condensation product being from 2.5 to 8500 mmol/kg (epoxide equivalent weight from 120 g/mol to 400,000 g/mol).

Suitable catalysts for the preparation of the dispersant (B-1) are strong inorganic and organic bases, for example alkali metal and alkaline-earth metal hydroxides and oxides (e.g., lithium hydroxide, sodium hydroxide, potassium hydroxide, calcium hydroxide, barium hydroxide, magnesium oxide, calcium oxide, etc.), alkali metal alcoholates (e.g., sodium methylate, lithium methylate, sodium ethylate, potassium dodecylate, etc.) and the alkali metal salts of carboxylic acids (e.g., sodium and lithium stearate and lactate) and also hydrides (for example, alkali metal and alkaline-earth metal hydrides and borohydrides, such as sodium hydride, calcium hydride and sodium borohydride, etc.). Also suitable are strong inorganic and organic protic acids (e.g., phosphoric acid, sulfuric acid, tetrafluoroboric acid and benzenesulfonic acid, etc.) and Lewis acids (e.g., tin(IV) chloride, titanium(IV) chloride, titanium (IV) isopropylate, triethyloxonium tetrafluoroborate and also boron trifluoride and its complexes, for example, those with phosphoric acid, acetic acid (1:1 and 1:2), methanol, diethyl ether, tetrahydrofuran, phenol, ethylene glycol monoethyl ether, polyethylene glycol (MW 200), dimethyl sulfoxide, di-n-butyl ether, di-n-hexyl ether, succinic acid and aliphatic, cycloaliphatic and araliphatic amines and also nitrogen heterocycles, etc.). However, certain inorganic salts are also highly suitable as catalysts, examples being alkali metal and alkaline earth metal fluorides, phosphates and stannates.

Preferred catalysts employed are the complexes of $BF_3$ with diethyl ether and acetic acid, and also aqueous tetrafluoroboric acid. The mass fraction of catalyst is in general from 0.1 to 5%, preferably from 0.1 to 1%, in the reaction mixture. For easier metered addition it is possible to dilute the catalyst in a solvent such as diethyl ether, a glycol ether or cyclic ether, ketones and the like.

The dispersant is prepared by heating the mixtures to be reacted, comprising compounds containing hydroxyl groups and epoxide groups, to the temperature at which condensation takes place at a sufficient rate, i.e., within 30 min to 5 hours. The reaction is advantageously monitored by way of the decrease in the epoxide group content. The reaction can be terminated by cooling to below the reaction temperature.

The condensation product thus obtained can be used as it is (100%) as dispersant (B-1) for producing the novel dispersions. Preferably however, for reasons of easier handling, a mixture is prepared having a mass fraction of from 20 to 99%, preferably from 40 to 60%, of the condensation product, preferably with water or, if desired, with a preferably aqueous medium, consisting of mass fractions of up to 100%, preferably up to 75%, of an organic solvent, and this mixture is used as dispersant (B-1). Suitable organic solvents are, in particular, glycols, mono- and diethers and mono- and diesters of glycols with alcohols and acids, aliphatic alcohols having linear or branched alkyl radicals of 1 to 12 carbon atoms, cycloaliphatic and araliphatic alcohols and also esters and ketones, it being possible to use these solvents individually or in a mixture. Examples which may be mentioned are ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and also methyl isobutyl ketone. Preference is given to the use of butylglycol, methoxypropanol, ethoxypropanol, 2-propanol, hydroxyethyl or hydroxypropyl methacrylate and/or benzyl alcohol, or the monomers listed under (C-1).

The diluent (C) is added all at once in its entirety prior to dispersion, and thus serves to reduce the viscosity and facilitates dispersion, or, in the case of a relatively large quantity, it is possible for some of it to be present during the dispersion operation and the rest to be added once dispersion has been carried out, for example, continuously during the emulsion polymerization. In this context it is not necessary for the two portions to be identical in respect of the nature and composition of the components (C-1) and, if appropriate, (C-2). This enables the specific production of core-shell particles in the case of epoxy-polyacrylate dispersions. The presence of the diluent during the dispersion has the advantage that it is not necessary to reduce the viscosity maximum during the phase inversion W/O-O/W because of inert solvents which remain in the finished dispersion, as has been described in DE 41 28 487. It is thus possible successfully to formulate completely solvent-free dispersions—another considerable improvement over the prior art. However, an excessive content during the dispersion operation would reduce the viscosity to a value so low that it would no longer be possible to develop the shear force necessary for the dispersion processes. For this reason it may be necessary to divide the entirety into two expedient portions.

Reactive diluent (C-1) is used in order to control the performance properties of the dispersion, for example, to reduce the minimum film-forming temperature, prolong the processing time (pot life), improve gloss, shear stability and stability to freeze-thaw cycles, and to exert a controlled effect on hardness and elasticity, etc. The advantage over the use of organic solvents is that, in the curing reaction, these reactive diluents are incorporated into the film and therefore do not lead to the unwanted emission of organic components; the claim to freedom from solvent therefore remains intact. The addition of the reactive diluent prior to the dispersion process has the substantial advantage that it can be emulsified much better and with less effort than in the case of subsequent addition to the finished dispersion, thereby leading to improved coating quality. In this case reactive diluent and base resin are present in conjoint micelles, something which cannot be achieved by subsequent homogeneous incorporation of the reactive diluents. The content of reactive diluent must be added on to the solids content of the binder and/or of the coating material.

To prepare the epoxy-polyacrylate dispersion the epoxy resin (A) is admixed at temperatures of from 60 to 200° C., preferably from 70 to 120° C., with the monomers (C-2)—possibly stabilized with appropriate inhibitors known to the person skilled in the art—and with reactive diluents (C-1) or an expedient portion thereof, then with the dispersants (B-1) and, if used, (B-2), followed, if desired, by organic solvent (D), and the mixture is then stirred for from 15 to 180 minutes, preferably from 30 to 90 minutes. Alternatively, after adding the monomers it is possible to carry out a reaction between epoxy resin and the monomers, for example, addition of carboxyl or amine monomers onto the epoxide groups or grafting onto aliphatic carbon atoms of the epoxide components (A) and (C-2) before adding the dispersant.

Thereafter, at temperatures of from 30 to 100° C., preferably from 50 to 90° C., the appropriate quantity of water (D) is metered in with vigorous stirring, preferably in a plurality of portions, thereby producing the aqueous dispersion. In this context it is possible if desired to add suitable antifoam/deaerating additives. Dispersion is advantageously carried out with the aid of suitable dispersing units, examples being a high-speed paddle stirrer, a pulsation-type spiral stirrer, a colloid mill, a homogenizer, a dissolver or any other rapid mixer with a high shear force. This operation is described in great detail in DE-A 41 28 487, the disclosure of which is hereby incorporated by reference.

In the resulting, monomer-containing and reactive diluent-containing epoxy resin dispersion, the emulsion polymerization is then initiated at a suitable temperature. The temperature must be sufficiently high to achieve a rapid polymerization rate while not so high that it poses a threat to the stability of the dispersion. In the case of redox initiators, the oxidizing agent is preferably incorporated by homogenization together with the dilution water, and the reducing agent is metered in continuously—however, all conceivable variants are likewise in accordance with the invention. If the quantity of monomers is higher than is required for the dispersion, then the remaining quantity of the monomers (C-2) are also metered in, enabling the specific preparation of core-shell acrylate particles, in order to exert the desired control over the properties of the dispersion. The preferred temperature range for the emulsion polymerization is from 60 to 90° C., with the reaction being monitored by determining the solids content or by gas chromatography. Any unwanted increase in viscosity can be compensated by metering in additional water.

The mass ratio of epoxy resin (A) to addition polymers (C-2) is from 99.5:0.5 to 20:80, preferably between 5:95 and 50:50. In this context the polymer (C-1) may include glycidyl-containing monomers, preferably in mass fractions of from 2.5 to 25%. The mass fraction of reactive diluent (C-1) can be up to 25% based on the mass of the polymers (A) and (C-2). The mass fraction of dispersant (B) is based on all nonwater-soluble constituents of the dispersion, i.e., on the epoxy resin (A), the polymer (C-2) and reactive diluent (C-1), and is between 1 and 25%, preferably between 2 and 15%. The composition of the dispersant in terms of (B-1):(B-2) is between 0:100 and 100:0, preferably more than 75:25. The solids content by mass of the novel dispersion is between 30 and 90%, but preferably from 55 to 75%, it being possible for the dispersion to include a mass fraction of up to 10% of solvents, although it is preferably solvent-free.

The epoxy resin according to (A) of the novel dispersions preferably has an epoxide group content of from 250 to 3000 mmol/kg, in particular from 300 to 2500 mmol/kg (epoxide equivalent weight of from 350 to 4000, in particular from 400 to 3000). The mean particle size of the dispersed resin is generally not more than 1 $\mu$m and is preferably from 0.2 to 0.8 $\mu$m. The particle size of the polyacrylate (C-2) is below 0.5 $\mu$m, preferably below 0.25 $\mu$m. Even in the case of grafting the particle sizes of the novel dispersions are below 1 $\mu$m.

The viscosity of these dispersions is in general between 200 and 30,000 mPa·s, preferably between 750 and 7000 mPa·s.

The novel dispersions are notable firstly for their good stability on storage, which can be attributed to the mean particle size being low for secondary dispersions, and also, in particular, for their very low or zero content of organic solvents, and in particular for the substantially greater solids content. In comParison with known epoxy resin dispersions and epoxy-acrylate dispersions, the coatings obtainable with the novel dispersions additionally possess a range of technical advantages, for example, low water sensitivity, good elasticity coupled with very high hardness, good to very good adhesion to a wide variety of substrates, outstanding anticorrosion effect in the case of coating metallic materials, extension of pot life, etc.

The hardeners and further curable resins according to (II) are preferably not added until directly before the use of the dispersion.

Owing to their aforementioned outstanding technical properties, for example, in respect of adhesion, very high hardness, anticorrosion effect, water and chemical resistance, etc., the novel dispersions are suitable, in combination with appropriate curing agents and additives, for the production of finish coatings, intermediate coatings, coating materials, molding compositions and curable compositions for a very wide variety of applications. For example, they can be used to produce protective and/or decorative coatings on a very wide variety of substrates, especially rough and porous substrates, for example, wood, mineral substrates (e.g. concrete and stone), glass, plastics (e.g. polyethylene, polypropylene, etc.), composite materials, ceramics and pretreated or nonpretreated metals.

The novel dispersions are also outstandingly suitable for one-coat finishing. The adhering coating can remain unchanged as such or else can be used as an intermediate coating, i.e., a base for further coatings, which may in turn consist of the same coating material or a different, conventional coating material.

From epoxy-polyacrylate dispersions it is possible, given an appropriate choice of reactive diluents (C-1) and monomers (C-2), to produce matt clearcoats whose other properties are of unchanged high quality (good adhesion to a wide variety of substrates, very high hardness, good resistance properties, etc.).

Owing to their ready dilutability and their favorable properties, the novel dispersions are also suitable for additional use in electrodeposition coating.

Another option is the use of the novel dispersions to produce water-dilutable adhesives. They can also be employed as binders for textile, organic and/or inorganic materials. Furthermore, they may serve as an additive to polymer-modified cements.

Where used as a coating composition or a predominantly aqueous coating material, the novel dispersion is applied to the substrate by conventional methods such as, for example, brushing, spraying, dipping or rolling. Where no curing agents for cold curing are used, the coatings are cured by heating at from 80 to 250° C. for a time which is sufficient for complete curing, in general from 5 to 60 minutes.

Any additives according to (III) required and also—should they be desired for the intended use—any further curing agents are added in quantities such as are needed for the corresponding purpose and are known to the person skilled in the art. In this case the choice of solids content and solvent content is open to the user.

The examples which follow describe the preparation of the epoxy resin (A), of the dispersant (B-1), of the dispersion (A)+(B)+(C) and of the binder (A)+(B)+(C)+(II) and also its use, with the examples being limited to the absolutely solvent-free systems which are particularly preferred.

EXAMPLES

I. Epoxy resins (A)

I.1 A commercially available epoxy resin based on bisphenol A and epichlorohydrin, having an epoxide group content of from about 2100 to 2300 mmol/kg (epoxide equivalent weight from 450 to 470 g/mol) (e.g., Beckopox® EP 301 or Epikote® 1001).

I.2 A flexibilized epoxy resin prepared by reacting 150 g of diglycidyl ether of polypropylene glycol, having an epoxide group content of from 2750 to 3150 mmol/kg (EV value from 320 to 360 g/mol) and 234 g of bisphenol A at 160° C. with about 0.2 g of triphenylphosphine until the epoxide groups have completely disappeared, and further reaction of this phenolic intermediate with 750 g of bisphenol A diglycidyl ether (epoxide group content 5400 mmol/kg; EV=185 g/mol) under the same conditions until the epoxide group content is from 2100 to 2300 mmol/kg (EV value from about 460 to 470 g/mol).

I.3 A self-dispersing epoxy resin of the Beckopox® EP 301 type obtained by reacting bisphenol A, its glycidyl ether (epoxide group content 5405 mmol/kg; EV value 185 g/mol) and a solvent-free dispersant (B-1) at temperatures of around 160° C. by analogy with the method described in DE-A 36 43 751.

II. Dispersant (B-1)

309 g of technical-grade polyethylene glycol having a weight-average molar mass (Mw) of 4000 g/mol and 34.1 g of a polyglycidyl ether based on bisphenol A, having an epoxide group content of 5460 mmol/kg (epoxide equivalent weight of 183 g/mol), were heated together to 100° C., and 0.35 ml of 50% strength aqueous tetrafluoroboric acid was added with stirring. The ratio of the number of hydroxyl groups to the number of epoxide groups was 1:1.20. The mixture was heated further to 130° C. and held at this temperature until the epoxide group content of the condensation product was about 2.9 mmol/kg (epoxide equivalent weight about 350,000 g/mol). After cooling, the emulsifier had a brittle, waxlike firm consistency and can be used directly for the preparation of the epoxy resin I.3.

250 g of this condensation product were dissolved in 250 g of water with stirring and gentle heating to about 80° C. The clear, pale yellow emulsifier solution obtained had a viscosity (measured in accordance with Brookfield, 25° C.) of 3500 mPa·s and a solids content by mass of 50%.

III. Dispersions (A) + (B) + (C)
Abbreviations for reactive diluents, monomers and solvents:

| | | | |
|---|---|---|---|
| HDDGE | 1,6-hexanediol diglycidyl ether | TBPGE | tert-butylphenyl glycidyl ether |
| CGE | cresyl glycidyl ether | AGE | $C_{13}$—$C_{15}$-alkyl glycidyl ether |
| EHGE | 2-ethylhexyl glycidyl ether | | |
| MMA | methyl methacrylate | MAA | methacrylic acid |
| GlyMA | glycidyl methacrylate | BuA | n-butyl acrylate |
| BDG | butyldiglycol | TX | Texanol |
| BzOH | benzyl alcohol | PM | methoxypropanol |

General working procedure for epoxy resin dispersions:

423 g of epoxy resin (A) are melted and homogenized at 100° C. with reactive diluent according to (C-1), and 81 g of dispersant (B) are added at 90° C. if appropriate (resins I.1 and I.2). Rapid stirring at 80° C. is carried out in order to incorporate from 50 to 90 g of water, stirring is carried out until phase inversion takes place, and about 170 g of water are added in portions, the temperature at the end being 60° C. The batch is adjusted with a little water to about 2500 mPa·s.

General working procedure for epoxy-polyacrylate dispersions:

423 g of epoxy resin (A) are melted and homogenized at 100° C. with diluent according to (C), consisting of reactive diluents (C-1) and monomers (C-2), and 81 g of dispersant (B) are added at 90° C. Rapid stirring is carried out at 80° C. in order to incorporate from 50 to 90 g of water, stirring is carried until phase inversion takes place, and about 170 g of water are added in portions, the temperature at the end being 60° C. A mass fraction of 1% (based on the mass of the monomers (C-2)) of tert-butyl hydroperoxide is added and the mixture is homogenized for 30 minutes while keeping it at 60° C. This temperature is maintained, 0.05 ml of $FeSO_4$ heptahydrate solution (2% in water) is added, and a mass fraction of 1.5% (based on the mass of monomers) of ascorbic acid is metered in over the course of 1.5 hours as a solution in about 45 g of water (if appropriate, the residual monomers are added at the same time), in the course of which a slight exothermic reaction is observed. After the batch has been able to after-react at 60° C. for another 1.5 h, it is adjusted with a little water to about 2500 mPa·s.

TABLE

| Ex. | Resin | Reactive dil. (%) | Solvent (%) | Monomers (%) | NVC (%) | EGC (mmol/kg) | EV s.f. (g/mol) | PS (nm) | Visc. (mPa.s) |
|---|---|---|---|---|---|---|---|---|---|
| III.1 | I.1 | 5 HDDGE | 0 | 9 MMA 1 GlyMA | 60.5 | 1233 | 811 | 406 | 6300 |
| III.2 | I.3 | 5 HDGE | 0 | 10 MMA | 58.5 | 1253 | 798 | 523 | 5400 |
| III.3 | I.3 | 7 TBPGE | 3 BzOH, 7 PM | 0 | 53.6 | 1182 | 846 | 568 | 3900 |
| III.4 | I.3 | 7 CGE | 3 BzOH, 7 PM | 0 | 55.2 | 1178 | 849 | 624 | 6100 |

TABLE-continued

| Ex. | Resin | Reactive dil. (%) | Solvent (%) | Monomers (%) | NVC (%) | EGC (mmol/kg) | EV s.f. (g/mol) | PS (nm) | Visc. (mPa.s) |
|---|---|---|---|---|---|---|---|---|---|
| III.5 | I.3 | 7 HDDGE | 3 BzOH, 7 PM | 0 | 53.6 | 1258 | 795 | 531 | 3000 |
| III.6 | I.3 | 7 AGE | 3 BzOH, 7 PM | 0 | 53.9 | 1116 | 896 | 563 | 3000 |
| III.7 | I.3 | 7 EHGE | 3 BzOH, 7 PM | 0 | 52.2 | 1182 | 846 | 496 | 3100 |
| V.1 | I.3 | 0 | 3 BzOH, 7 PM | 0 | 53.0 | 1000 | 1000 | 600 | 1200 |
| V.2 | I.3 | 0 | 3 BDG, 7 TX | 0 | 49.0 | 980 | 1020 | 530 | 3500 |
| V.3 | I.3 | 0 | 7 PM | 0 | 52.6 | 1052 | 950 | 634 | 3000 |
| V.4 | I.1 | 0 | 0 | 10 MMA | 63.1 | 1111 | 900 | 863 | 1000 |
| V.5 | I.1 | 0 | 0 | 9 MMA 1 GlyMA | 63.2 | 1170 | 855 | 595 | 590 |

Abbreviations:
NVC nonvolatiles content, solids content (1 g, 1 h, 125° C.)
EGC epoxide group content
EV epoxide equivalent weight (s.f. = supply form)
PS particle size, photon correlation spectroscopy, monomodal IV. Preparation of the novel coating compositions 50 g of dispersion are mixed in a 1:1 stoichiometric ratio with a curing agent according to EP-A 0 000 605 (Example 5c) which has been diluted with water to 40% (content of active hydrogen atoms 3125 mmol/kg; "H-active equivalent weight" 320 g/mol), and this mixture is drawn out as a clearcoat onto degreased glass panels (wet film thickness about 200 μm). Drying takes place at room temperature.

V. Performance properties

Explanation of the test conditions:

1. Dust-dry: glass beads scattered on the film can no longer be removed with a brush after full curing.

room temperature. The evaluation scale changes from 0=very good to 5=poor.

6. MFT plot: the change in the MFT (minimum film-forming temperature) over the reaction period was measured on a Coesfeld (MFT-"D") test bench. Errors in film formation (drying temperature lower than MFT) appear in the form of cracks in the film, clouding and blushing; the temperature at which an intact film is still just formed is the MFT. MFT/reaction time functions were obtained in this way for a reaction temperature of 20° C.

Performance testing of the coating compositions
Epoxy resin dispersions

| Example | | | III.2 | III.3 | III.4 | III.5 | III.6 | V.1 | V.2 | V.3 |
|---|---|---|---|---|---|---|---|---|---|---|
| Hardener | | g | 23.6 | 23.6 | 25.2 | 22.3 | 23.6 | 20.0 | 19.6 | 20.5 |
| Pot life | | h.min | 3.50 | 6.05 | 6.00 | 6.30 | 6.10 | 3.30 | 4.00 | 0.25 |
| Dust-dry | | h.min | 0.30 | 0.45 | 0.50 | 0.35 | 0.40 | 0.30 | 1.35 | 0.40 |
| Tack-free | | h.min | 6.10 | 4.45 | 4.50 | 4.30 | 5.45 | 5.00 | 8–24 | 8–24 |
| Leveling | | * | 0 | 0 | 0 | 0–1 | 0–1 | 0 | 0 | 0–1 |
| Film clouding | | * | 0 | 0 | 0 | 0 | 0 | 0 | 0 | 0 |
| Surface tack | | * | 0 | 0 | 0 | 0 | 0 | 0 | 0 | 0 |
| Pendulum hardness | after 1 d | s | 73 | 60 | 61 | 45 | 50 | 73 | 22 | 124 |
| | after 2 d | s | 97 | 80 | 82 | 63 | 72 | 95 | 36 | 173 |
| | after 7 d | s | 158 | 137 | 143 | 118 | 130 | 151 | 52 | 189 |
| Water resistance | after 1 d | * | 1–2 | 2 | 1–2 | 2 | 2 | 1–2 | 2–3 | 1–2 |
| Pendulum hardness after storage in water | | s | 63 | 51 | 51 | 44 | 46 | 61 | 21 | 109 |
| MFT | Initial | ° C. | 5.2 | 2.8 | 5.0 | 1.3 | −1.8 | 6.5 | −16.2 | 13.0 |
| | Slope | | 0.09 | 0.06 | 0.06 | 0.06 | 0.07 | 0.09 | 0.17 | 0.48 |

*Scale 0 = very good to 5 = inadequate

2. Tack-free: the glass beads can be removed with a brush after full curing.
3. Pot life: after mixing of hardener and dispersion, films with a wet thickness of 200 μm are drawn out every half an hour. The appearance of cloudiness in the film after full curing indicates the end of the pot life and is recorded as the test result.
4. Hardness: König pendulum hardness, DIN 53 157.
5. Water resistance after 24 h, storage at room temperature: films with a wet thickness of 200 μm drawn out on glass panels are tested after storage for 24 h in water at The considerably extended pot life of the system with reactive diluent is very clearly evident. Films thereof have properties which are comParable with those of standard systems (V.1 and V.3), while the comParison V.2 in fact falls behind the standard systems, without any disproportionate extension of pot life occurring as a result of Texanol. Overall, the novel coatings are not significantly softer than the standards V.1 and V.3. The combination of butyldiglycol+Texanol (V.2), although producing the greatest reduction in MFT, still does not bring the extension of pot life which is to be expected, owing to the sharp rise in MFT in the course of curing (crosslinking and evaporation in parallel).

V.3 possesses an inadequately low pot life, since in this case the only coalescence agent present is methoxypropanol which is not sufficiently effective.

Epoxy-acrylate dispersions

|  |  | Example | | | |
|---|---|---|---|---|---|
|  |  | III.1 | III.2 | V.4 | V.5 |
| Hardener |  | g | 16.9 | 17.1 | 22.1 | 17.0 |
| Pot life |  | h.min | 2.50 | 3.00 | 0.15 | <0.30 |
| Dust-dry |  | h.min | 0.45 | 0.45 | 0.25 | 30 |
| Tack-free |  | h.min | 4.30 | 4.30 | 1.15 | 1.10 |
| Leveling |  | * | 0 | 0 | 0 | 0 |
| Film clouding |  | * | 0 | 0–1 | 3–4 | 0 |
| Surface tack |  | * | 0 | 0 | 0 | 0 |
| Pendulum hardness | after 1 d | s | 62 | 55 | 132 | 146 |
|  | after 2 d | s | 89 | 77 | 14 | 177 |
|  | after 7 d | s | 145 | 132 | 188 | 201 |
| Water resistance | after 1 d | * | 0–1 | 1–2 | 4 | 0–1 |
| Pendulum hardness | after storage in water | s | 84 | 63 | 83 | 103 |

*Scale 0 = very good to 5 = inadequate

While the comParison systems have impracticably short pot lives, and V.4 additionally gives a water-sensitive coating, here too the advantageous effect achieved by the reactive diluents is evident. The only thing which cannot be attained is the high film hardness of the standards.

Nature and timing of the addition of the reactive diluent The dispersion III.5 was comPared with Beckopox EP 384w, when a dispersion of hexanediol diglycidyl ether was added subsequently to the latter.

|  |  |  | Example | | |
|---|---|---|---|---|---|
|  |  |  | III.5 | III.5-1 | III.5-2 |
| Reactive diluent HDDGE |  | g | — | 1.75 | 1.75 |
| Hardener |  | g | 22.3 | 14.4 | 14.4 |
| Pot life |  | h.min | 5.50 | 3.30 | 3.30 |
| Dust-dry |  | h.min | 0.50 | 0.50 | 0.50 |
| Tack-free |  | h.min | 5.10 | 5.00 | 5.10 |
| Clouding |  | * | 0 | 0 | 0 |
| Pendulum hardness | after 1 d | s | 49 | 57 | 54 |
|  | after 2 d | s | 83 | 87 | 86 |
|  | after 7 d | s | 179 | 187 | 186 |
| Water resistance | after 1 d | * | 1–2 | 1–2 | 1–2 |
| Pendulum hardness | after storage in water | s | 56 | 58 | 58 |

*Scale 0 = very good to 5 = inadequate
III.5-1: HDDGE incorporated just by dispersion for 5 minutes with a Teflon disk on the dissolver.
III.5-2: HDDGE incorporated by stirring for 5 minutes with a spatula.

It is evident here that, apart from a distinct extension of pot life when the reactive diluent is added prior to the dispersion of the base resin, there are no major differences between the dispersions.

The entire disclosure of German Patent Application No. 195 36 381.7, filed Sep. 29, 1995, is hereby incorporated by reference.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An aqueous, low-solvent coating composition comprising
   (I) a base resin dispersion comprising
      (A) an epoxy resin which is a condensation product of proportions by mass of
         (A-1) from 50 to 95% of one or more epoxide compounds having at least two epoxide groups per molecule
         (A-2) from 5 to 50% of an aromatic polyol.
      (B) a dispersant comprising
         (B-1) a condensation of
            (B-11) an aliphatic polyol having a weight-average molar mass ($M_w$) of from 200 to 20,000 g/mol and
            (B-12) an epoxide compound having at least two epoxide groups per molecule, and
      (C) a diluent comprising
         (C-1) a low molecular mass, liquid, epoxy-functional compound, and
      (D) water,
   (II) an aqueous curing agent for the modified epoxy resin (I), which is suitable for curing at room temperature or at elevated temperatures (forced drying), components (I) and (II) being employed in proportions by mass such that the ratio of the number of epoxide groups in (I) which are capable of reaction to the number of amine hydrogen atoms in (II) is between 1:0.75 and 1:2, wherein during preparation of the coating composition at least a portion of the low molecular mass epoxy compound C-1 is added to the base resin prior to its dispersion in water.

2. An aqueous, low-solvent coating composition as claimed in claim 1, wherein the epoxy resin (A) comprises a condensation product comprising mass fractions of
   (A-1) from 55 to 85% of one or more epoxide compounds having at least two epoxide groups per molecule and an epoxide group content of from 300 to 12,000 mmol/kg, and
   (A-2) from 15 to 45% of an aromatic polyol.

3. An aqueous, low-solvent coating composition as claimed in claim 1, further comprising an additional starting material used to prepare the epoxy resin (A) comprising a mass fraction of
   (A-3) from 1 to 25% of a modifying compound having at least two epoxide-reactive groups.

4. An aqueous, low-solvent coating composition as claimed in claim 1, where in the starting materials for preparing the dispersant (B-1), the ratio of the n umber of OH groups in (B-11) to that of the epoxide groups in (B-12) is from 1:0.5 to 1:3.5, and the epoxide group content of this condensation product (B1) is between 2.5 and 200 mmol/kg.

5. An aqueous, low-solvent coating composition as claimed in claim 1, wherein the dispersant (B) additionally comprises a nonionic surfactant.

6. A n aqueous, low-solvent coating composition as claimed in claim 1, wherein the diluent (C) additionally comprises a free-radically polymerizable, olefinically unsaturated compound (C-2) which is otherwise inert.

7. An aqueous, low-solvent coating composition as claimed in claim 1, wherein the dispersion comprises a mass fraction of up to 10% of solvent.

8. An aqueous, low-solvent coating composition as claimed in claim 1, wherein the epoxide compounds according to (A-1) and (B-12) are selected independently of one another from the group consisting of polyglycidyl ethers of polyhydric alcohols, phenols, hydrogenated phenols and novolaks and also polyglycidyl esters of aliphatic, cycloaliphatic and aromatic polycarboxylic acids having 2 to 40 carbon atoms, with an epoxide group content of between 300 and 12,000 mmol/kg.

9. An aqueous, low-solvent coating composition as claimed in claim 8, wherein the epoxide group content of (A-1) and (B-12), in each case independently of one another, is between 500 and 11,000 mmol/kg.

10. An aqueous, low-solvent coating composition as claimed in claim 8, wherein the epoxide group content of (A-1) and (B-12), in each case independently of one another, is between 2800 and 10,000 mmol/kg.

11. An aqueous, low-solvent coating composition as claimed in claim 1, wherein the aromatic polyol (A-2) is selected from dihydric and polyhydric mono- and polycyclic phenols, their halogenation products, and novolaks.

12. An aqueous, low-solvent coating composition as claimed in claim 3, wherein modifying compound (A-3) comprises a substance other than aromatic polyols and has at least two functional groups which are reactive toward epoxide groups.

13. An aqueous, low-solvent coating composition as claimed in claim 3, wherein the modifying compound (A-3) is selected from the group consisting of aliphatic polyamines, polyoxyalkylene mono- and diamines, aliphatic and aromatic polycarboxylic acids having 2 to 60 carbon atoms, and aliphatic polyols.

14. An aqueous, low-solvent coating composition as claimed in claim 1, wherein the compound (B-1) is selected from the group consisting of polyoxyalkylene polyglycols having weight-average molar masses of from 600 to 12,000 g/mol.

15. An aqueous, low-solvent coating composition as claimed in claim 1, wherein the compound (C-1) is selected from the group consisting of the low molar mass ethers of glycidyl alcohol with monohydric and polyhydric phenols, alkyl-substituted phenols and monohydric and polyhydric aliphatic branched and unbranched alcohols and esters of branched or unbranched aliphatic carboxylic acids having 2 to 40 carbon atoms.

16. An aqueous, low-solvent coating composition as claimed in claim 6, wherein the compound (C-2) is selected from the group consisting of the esters of $\alpha,\beta$-olefinically unsaturated carboxylic acids with aliphatic alcohols having 1 to 18 carbon atoms, aromatic vinyl compounds, vinyl esters and vinyl halides, $\alpha,\beta$-olefinically unsaturated carboxylic acids and their amides and nitrites.

17. An aqueous, low-solvent coating composition as claimed in claim 1, wherein the curing agent (II) is selected from the group consisting of polyamines, Mannich bases, epoxy-amine adducts having free amino groups, polyamidoamines and latent curing agents.

18. An aqueous, low-solvent coating composition as claimed in claim 17, wherein the latent curing agent is selected from the group consisting of urea, dicyandiamide, (substituted) imidazole, (substituted) imidazoline, guanidine, acetoguanamine and benzoguanamine.

19. A process for producing an aqueous modified epoxy resin dispersion (I) which comprises
(A) an epoxy resin which is a condensation product of mass fractions of
  (A-1) from 50 to 95% of one or more epoxide compounds having at least two epoxide groups per molecule
  (A-2) from 5 to 50% of an aromatic polyol
(B) a dispersant comprising
  (B-1) a condensation product of
  (B-11) an aliphatic polyol having a weight-average molar mass ($M_w$) of from 200 to 20,000 g/mol and
  (B-12) an epoxide compound having at least two epoxide groups per molecule, and
(C) a diluent comprising
  (C-1) a low molar mass, liquid, epoxy-functional compound, and
(D) water, comprising:
first preparing epoxy resin (A) by condensation of components (A-1), (A-2) and, optionally, (A-3) at an elevated temperature in the presence of a condensation catalyst, then at a lower temperature adding at least a portion of the diluent (C) and, optionally, carrying out a partial reaction of the monomers (C-2) with the epoxy resin (A), then incorporating the dispersant (B) by homogenization and obtaining an aqueous dispersion by the portionwise addition of water (D), the monomers (C-2) subsequently being converted completely into a polymer dispersion with the aid of an appropriate initiator system and, optionally, with the addition of the remaining diluent (C).

20. An aqueous, low-solvent coating composition prepared by the process of claim 19.

21. A coated article, comprising a substrate and a coating produced from a coating composition as claimed in claim 1.

22. A coated article as claimed in claim 21, wherein the coating comprises a matt clearcoat.

23. A water-dilutable adhesive comprising an aqueous dispersion as claimed in claim 1.

* * * * *